United States Patent
Choi (10) Patent No.: US 9,703,528 B2
(45) Date of Patent: Jul. 11, 2017

(54) METHOD AND SYSTEM FOR VEHICLE-CONNECTED OPERATION OF MOBILE DEVICE, AND SUCH MOBILE DEVICE

(71) Applicant: Samsung Electronics Co., Ltd, Gyeonggi-do (KR)

(72) Inventor: Bokun Choi, Seoul (KR)

(73) Assignee: Samsung Electronics Co., Ltd, Suwon-si, Gyeonggi-do (KR)

( * ) Notice: Subject to any disclaimer, the term of this patent is extended or adjusted under 35 U.S.C. 154(b) by 128 days.

(21) Appl. No.: 14/055,733

(22) Filed: Oct. 16, 2013

(65) Prior Publication Data

US 2014/0107891 A1 Apr. 17, 2014

(30) Foreign Application Priority Data

Oct. 16, 2012 (KR) .................. 10-2012-0114563

(51) Int. Cl.
G06F 3/041 (2006.01)
G06F 7/00 (2006.01)
H04M 1/60 (2006.01)

(52) U.S. Cl.
CPC ............ *G06F 7/00* (2013.01); *H04M 1/6083* (2013.01)

(58) Field of Classification Search
None
See application file for complete search history.

(56) References Cited

U.S. PATENT DOCUMENTS

| | | | |
|---|---|---|---|
| 2007/0198148 A1* | 8/2007 | Namaky | 701/29 |
| 2011/0122074 A1* | 5/2011 | Chen et al. | 345/173 |
| 2013/0019020 A1* | 1/2013 | Kang | H04M 1/72561 709/227 |
| 2013/0226401 A1* | 8/2013 | Wang et al. | 701/36 |
| 2013/0274997 A1* | 10/2013 | Chien | 701/36 |
| 2015/0282230 A1* | 10/2015 | Kim | H04W 84/20 370/329 |

FOREIGN PATENT DOCUMENTS

| JP | 2011-112640 | 6/2011 |
|---|---|---|
| KR | 10-2010-00109061 | 10/2010 |

OTHER PUBLICATIONS

Webpage https://manuals.info.apple.com/Manuals/1000/MA1565/en_US/iphone_user_guide.pdf.*

* cited by examiner

*Primary Examiner* — John R Olszewski
*Assistant Examiner* — James M McPherson (57) ABSTRACT

A vehicle-connected operation system and method includes a vehicle and the mobile device. The vehicle includes an in-vehicle electronic control system activated in response to an ignition start signal, and a vehicle connector coupled to the in-vehicle electronic control system. The mobile device is configured to automatically invoke at least one predefined user function depending on connection or disconnection of the vehicle connector.

19 Claims, 6 Drawing Sheets

METHOD AND SYSTEM FOR VEHICLE-CONNECTED OPERATION OF MOBILE DEVICE, AND SUCH MOBILE DEVICE

CROSS-REFERENCE TO RELATED APPLICATION(S) AND CLAIM OF PRIORITY

The present application is related to and claims the benefit under 35 U.S.C. §119(a) of a Korean patent application filed on Oct. 16, 2012 in the Korean Intellectual Property Office and assigned Serial No. 10-2012-0114563, the entire disclosure of which is hereby incorporated by reference.

TECHNICAL FIELD

This disclosure relates to the operation of a mobile device and, more particularly, to a method, system and mobile device for providing specific services specialized for a vehicle under conditions that the mobile device operates in connection with the vehicle.

BACKGROUND

A variety of mobile devices having a communication function are becoming increasingly popular due to high usability and portability. Touchscreens are enlarged, and owing to a support by hardware and software that have ability to offer various contents, mobile devices are now showing growth.

Meanwhile, passenger vehicles for transporting persons or things are widely used as necessities for modern life styles. In addition, most of recent vehicles have the electronic control unit (ECU) that controls various electrical systems or subsystems embedded therein such as engine control module, transmission control module and brake control module.

In these circumstances, there arises a need of some approaches to offer specific services based on a connection between a vehicle and a mobile device and thereby to give improved convenience to a user.

SUMMARY

To address the above-discussed deficiencies embodiments of the present disclosure may provide a method, system and mobile device for vehicle-connected operation that includes automatically offering predefined in-vehicle functions in response to the connection of a mobile device with a vehicle connector and automatically offering predefined out-of-vehicle functions in response to the disconnection of the mobile device from a vehicle connector, thus realizing much more convenient environments for the use of mobile devices without requiring additional manipulations.

Certain embodiments of the present disclosure may provide a system for vehicle-connected operation of a mobile device. This system may include a vehicle and a mobile device. The vehicle may include an in-vehicle electronic control system activated in response to an ignition start signal, and a vehicle connector coupled to the in-vehicle electronic control system. The mobile device may be configured to automatically invoke at least one predefined user function depending on connection or disconnection of the vehicle connector.

Certain embodiments of the present disclosure may provide a mobile device for supporting vehicle-connected operation. The mobile device may include a connector and a control unit. The connector may be configured to be connected with a vehicle connector. The control unit may be configured to check an in-vehicle function list having at least one predefined user function registered therein when the vehicle connector is connected with the connector, and to automatically invoke the at least one user function registered in the in-vehicle function list.

Certain embodiments of the present disclosure may provide a mobile device for supporting vehicle-connected operation. The mobile device may include a connector and a control unit. The connector may be configured to be connected with a vehicle connector. The control unit may be configured to check an out-of-vehicle function list having at least one predefined user function registered therein when the vehicle connector is disconnected from the connector, and to automatically invoke the at least one user function registered in the out-of-vehicle function list.

Certain embodiments of the present disclosure may provide a method for vehicle-connected operation of a mobile device. This method may include recognizing connection of a vehicle connector with a connector of the mobile device, checking an in-vehicle function list having at least one predefined user function registered therein, and automatically invoking the at least one user function registered in the in-vehicle function list.

Certain embodiments of the present disclosure may provide a method for vehicle-connected operation of a mobile device. This method may include recognizing disconnection of a vehicle connector from a connector of the mobile device, checking an out-of-vehicle function list having at least one predefined user function registered therein, and automatically invoking the at least one user function registered in the out-of-vehicle function list.

As described above, the method, system and mobile device may allow more convenient use of various functions in an in-vehicle state in response to user's simple action of connecting the mobile device with the vehicle connector coupled to the in-vehicle electronic control system. Additionally, user's simple action of disconnecting the mobile device from the vehicle connector allows more convenient use of various functions in an out-of-vehicle state.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication device.

Specific, non-limiting embodiments will now be described more fully with reference to the accompanying drawings. This disclosure may, however, be embodied in many different forms and should not be construed as limited to the embodiments set forth herein.

Well known or widely used techniques, elements, structures, and processes may not be described or illustrated in detail to avoid obscuring the essence of this disclosure. Furthermore, the drawings are not necessarily to scale, and hence certain features may be exaggerated or omitted in order to better illustrate and explain the disclosed embodiments.

Figure 1:
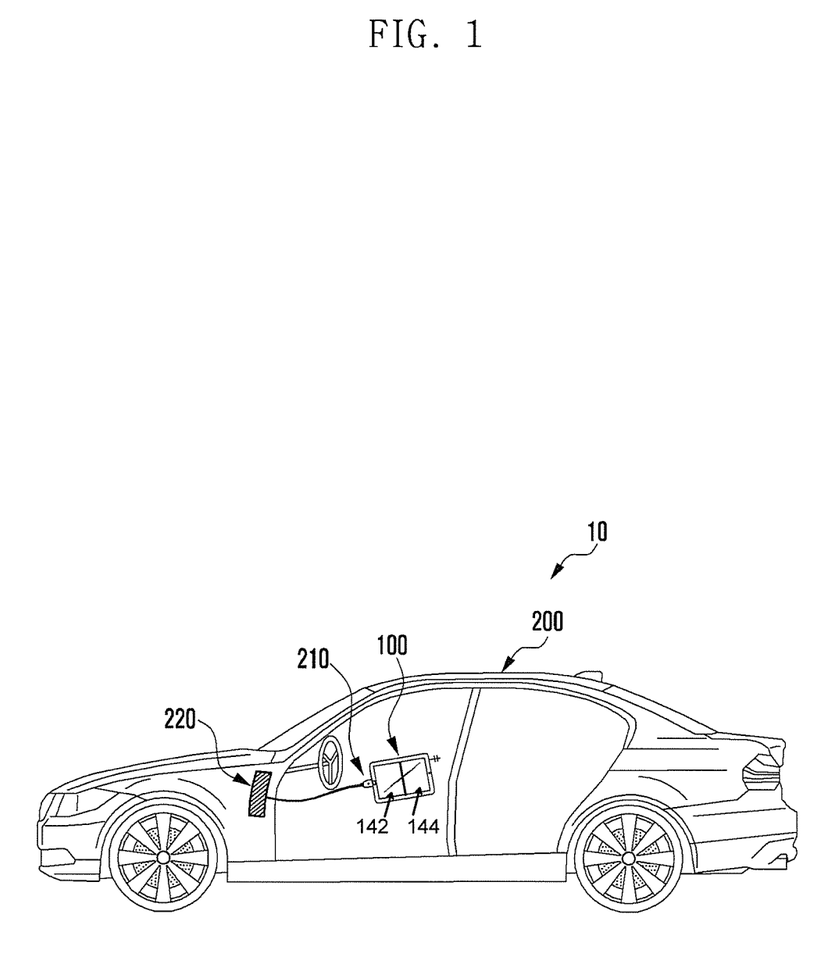
FIG. 1 is a schematic diagram illustrating elements of a system for vehicle-connected operation of a mobile device in accordance with embodiments of this disclosure.

FIG. 1 is a schematic diagram illustrating some elements of a system for vehicle-connected operation of a mobile device in accordance with embodiments of this disclosure.

Referring to FIG. 1, the system 10 for vehicle-connected operation of a mobile device may include a vehicle 200 and the mobile device 100.

In this system 10, when the mobile device 100 is connected with a vehicle connector 210 coupled to an in-vehicle electronic control system 220 and when the in-vehicle electronic control system 220 is activated, the mobile device 100 recognizes the connection of the vehicle 200 and then invokes at least one of user functions registered in a predefined in-vehicle function list. Further, when the mobile device 100 is disconnected from the vehicle connector 210, the mobile device 100 invokes at least one of user functions registered in a predefined out-of-vehicle function list. Therefore, the system 10 for vehicle-connected operation of the mobile device may allow predefined particular user functions to be automatically invoked in response to a simple action such as the connection or disconnection of the mobile device 100 with or from the vehicle connector 210. Also, automatically invoking predefined particular user functions may allow much more convenient use of the mobile device 100 in connection with the vehicle 200.

Normally, the vehicle 200 may transport people or things. Particularly, the vehicle 200 may be equipped with the in-vehicle electronic control system 220 for an electronic control of various vehicle-associated functions. Further, the in-vehicle electronic control system 220 can have what is called OBD (On Board Diagnosis) to support a general control of the vehicle 200, for example, exhaust gas control, engine control, light control, wiper control, and the like. The in-vehicle electronic control system 220 may include the vehicle connector 210 that corresponds to an OBD terminal or OBD connector to be used for the connection with any external device. The vehicle connector 210 may have a suitable form for the connection with an external connector equipped in the mobile device 100. For example, the vehicle connector 210 can include a twenty-pin insertion form. Also, the vehicle connector 210 can include a specific form selected from various forms that are fit for various connector structures of various mobile devices. For example, the vehicle connector 210 can include a Universal Serial Bus (USB) type form. The vehicle 200 may activate the in-vehicle electronic control system 220 when an ignition start signal is received. The in-vehicle electronic control system 220 may initialize general components of the vehicle 200. Then, the in-vehicle electronic control system 220 may send a specific signal (for example, OBD control signal) to the vehicle connector 210 to check whether any external device is connected.

The mobile device 100, which a user can carry, may be disposed at a certain place in the vehicle 200. The mobile device 100 may support a variety of user functions, depending on user's manipulations. For example, the mobile device 100 may support various functions such as a navigation support function, a black box support function, a music play function, a call function, a search function, and the like, depending on types of installed applications and user's manipulations. Particularly, among such functions, the mobile device 100 can automatically perform at least one of the user functions registered in a predefined in-vehicle function list in response to connection with the vehicle connector 210. Also, the mobile device 100 may automatically perform at least one of user functions registered in a predefined out-of-vehicle function list in response to disconnection from the vehicle connector 210.

As described above, the system 10 for vehicle-connected operation of the mobile device 100 may automatically invoke a predefined particular user function when a user of the mobile device 100 gets into the vehicle 200, even though he or she neither checks a function list nor selects and triggers a desired function in the list. This allows a user to focus on driving. Similarly, when a user gets out of the vehicle 200, the system 10 may selectively invoke a particular user function connected with the vehicle 200.

Figure 2:
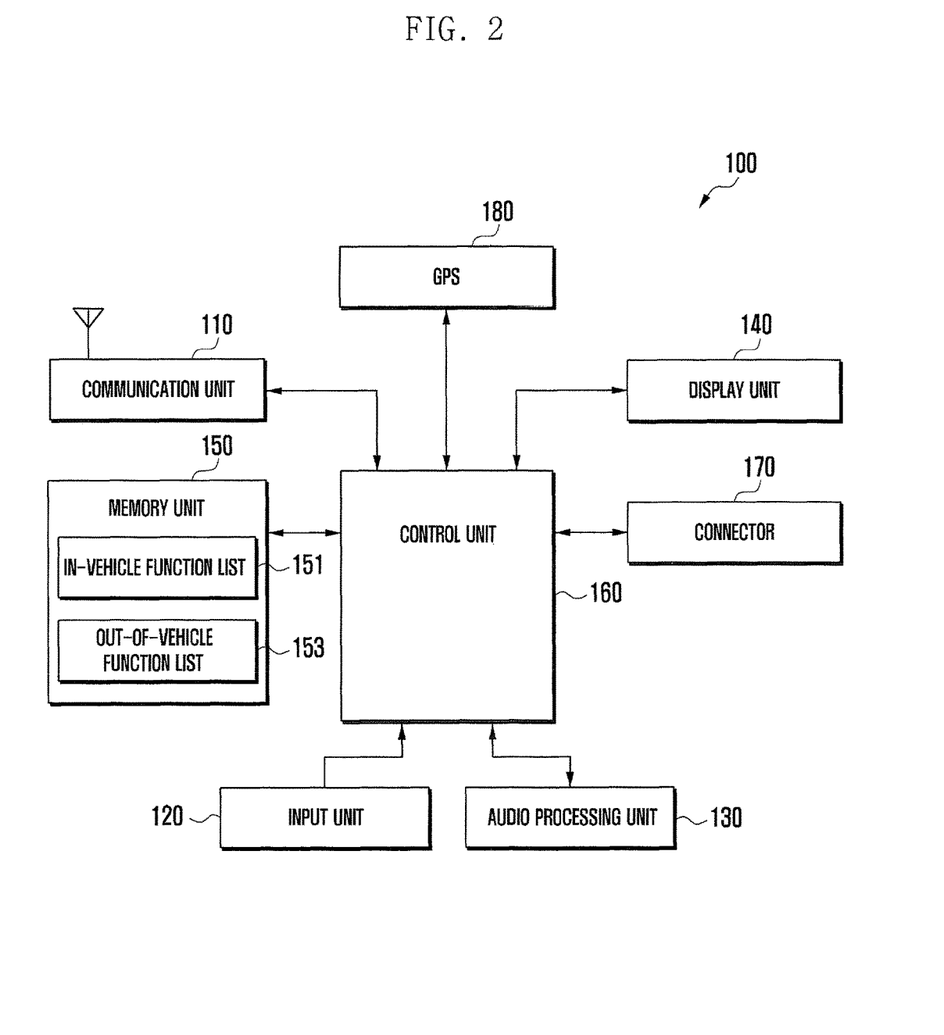
FIG. 2 is a block diagram illustrating elements of the mobile device shown in FIG. 1.

FIG. 2 is a block diagram illustrating elements of the mobile device 100 shown in FIG. 1.

Referring to FIG. 2, the mobile device 100 may include a communication unit 110, an input unit 120, an audio processing unit 130, a display unit 140, a memory unit 150 and a control unit 160. In addition, the mobile device 100 may further include a connector 170 and a GPS module 180 which is used as a location tracking module.

The mobile device 100 may automatically invoke a particular user function on the basis of an in-vehicle function list 151 stored in the memory unit 150 when the vehicle connector 210 is connected with the connector 170. Thus, when a user gets in the vehicle 200, the mobile device 100 may automatically activate a particular user function, defined in advance by the user. In response to a mere connection of the vehicle connector 210 without requiring any user's action for searching and selecting such a user function. Particularly, on receipt of any type of vehicle data from the in-vehicle electronic control system 220 which is activated when the vehicle 200 starts up, the mobile device 100 may automatically invoke at least one of user functions registered in the in-vehicle function list 151. Namely, if specific vehicle data is received, the mobile device 100 may perform a specific user function predefined corresponding to the received data. Additionally, in response to disconnection of the vehicle connector 210 from the connector 170 when a user gets out of (for example, exits the passenger compartment) the vehicle 200, the mobile device 100 may automatically invoke a particular user function registered in a predefined out-of-vehicle function list 153.

The communication unit 110 may support a communication function of the mobile device 100. The communication unit 110 establishes a communication channel for vehicle-connected operation disclosed herein. Namely, when the vehicle connector 210 is connected with the connector 170, the communication unit 110 may be activated under the control of the control unit 160 and automatically access a specific server that provides navigation information. The communication unit 110 may receive the navigation information from the server and deliver it to the control unit 160. The reception of navigation information may be performed continuously while the mobile device 100 supports a navigation function. Also, when the vehicle connector 210 is connected with the connector 170, the communication unit 110 may be automatically activated under the control of the control unit 160 and then transmit a predetermined message (for example, a message informing about a ride in the vehicle 200) to predetermined other mobile device. Additionally, if a selected user function is a function to receive music data from a specific server and then play the received music data, the communication unit 110 may access the server, receive music data from the server in real time or periodically, and deliver the received data to the control unit 160. Meanwhile, if the mobile device 100 need not support a communication function, the communication unit 110 may not be included in the mobile device 100.

The input unit 120 is an element that creates various input signals required for the operation of the mobile device 100. Examples of an input unit 120 may include a home key, a side key, a keypad, and the like. If the display unit 140 supports an input function, the input unit 120 can be formed of a touch screen or a touch panel. Additionally, the input unit 120 can be formed of a stylus pen, an electromagnetic induction pen, or any other the like. The input unit 120 may create an input signal for defining or setting the in-vehicle function list 151 and the out-of-vehicle function list 153 in response to user's manipulation. Namely, the input unit 120 may create an input signal for registering a new user function or removing or inactivating a registered user function in or from the in-vehicle function list 151 and the out-of-vehicle function list 153. Such input signals may be transmitted to the control unit 160 to act as corresponding commands.

The audio processing unit 130 may include a speaker to output various audio data in connection with the operation of the mobile device 100. If the mobile device 100 supports a call function or a voice recording function, the audio processing unit 130 can further include a microphone to collect audio data. When the vehicle connector 210 is connected to the connector 170, the audio processing unit 130 may output feedback sounds or sound effects to inform about the connection. If the vehicle connector 210 is inserted into the connector 170 in a state where the in-vehicle electronic control system 220 is activated, the audio processing unit 130 may output feedback sounds or sound effects. However, if the vehicle connector 210 is inserted into the connector 170 in a state where the in-vehicle electronic control system 220 is not activated, the audio processing unit 130 may not output audio data. If the in-vehicle electronic control system 220 is activated and sends vehicle data after the vehicle connector 210 is inserted into the connector 170, the audio processing unit 130 may output feedback sounds or sound effects to inform a vehicle connection at last. Thereafter, the audio processing unit 130 may output suitable audio data whenever a specific user function registered in the in-vehicle function list 151 requires the output of audio data. Additionally, when the vehicle connector 210 is separated from the connector 170, the audio processing unit 130 may output feedback sounds or sound effects to inform about a vehicle disconnection. Also, the audio processing unit 130 may output audio data in connection with the activation of a specific user function registered in the out-of-vehicle function list 153. If there is no user function registered in the out-of-vehicle function list 153 or if an input signal for terminating vehicle-connected operation is received, the audio processing unit 130 may output corresponding feedback sounds or sound effects. Such feedback sounds or sound effects can be defined as the default by a designer and revised or newly registered by a user. Otherwise, the output of feedback sounds or sound effects from the audio processing unit 130 may be unavailable by user's setting.

The display unit 140 may display various screens required for the operation of the mobile device 100. If a navigation function as one example of a specific user function selected by a user is invoked, the display unit 140 may output map information, route guidance information, traffic information, and the like in connection with the navigation function. In another example, in response to a request for a music play function, the display unit 140 may output various screens associated with the music play function (for example, a music play control screen), a music file list search screen, an album jacket or music video screen of selected music, and the like. In another example, if a parking tracking function is invoked after the disconnection from the vehicle 200, the display unit 140 may provide information about a parking location in the form of arrow indicating a direction from the location of the mobile device 100, or offer map information showing both locations of the mobile device 100 and the parked vehicle 200.

Particularly, the display unit 140 may display a setting screen for setting at least one of the in-vehicle function list 151 and the out-of-vehicle function list 153 stored in the memory unit 150. For this, the display unit 140 may output, at a certain place of any screen, a menu or icon for triggering the setting screen for the in-vehicle function list 151 and the out-of-vehicle function list 153. Through this setting screen, a user can add a new function to or deregister or remove an existing function from the in-vehicle function list 151. Through this setting screen, a user can add a new function to or deregister or remove an existing function from the out-of-vehicle function list 153.

The memory unit 150 may store a variety of programs required for the operation of the mobile device 100, programs associated with a variety of functions supported by the mobile device 100, and data in connection with such programs. Particularly, the memory unit 150 may store the in-vehicle function list 151 and the out-of-vehicle function list 153, and also store various applications capable of supporting respective functions registered in the in-vehicle function list 151 and the out-of-vehicle function list 153.

The in-vehicle function list 151 may indicate information about various user functions registered to operate in case of connection with the vehicle 200. The in-vehicle function list 151 may include function registration information and invocation selection information. Specifically, the function registration information indicates specific user functions registered in the in-vehicle function list 151 among various user functions supported by the mobile device 100, and the invocation selection information indicates specific user functions selected to be automatically invoked in response to the connection between the vehicle connector 210 and the connector 170 among such registered functions. Namely, the invocation selection information may be information about some user functions selected from all user functions defined in the function registration information so as to be automatically activated when the vehicle connector 210 is connected. The in-vehicle function list 151 may contain, as the default, a navigation function, a music play function, a received call block function, a black box function, and the like in the function registration information. A user can modify the in-vehicle function list 151 by inactivating or deleting a desired one of such functions.

The out-of-vehicle function list 153 may indicate information about various user functions registered to operate in case of disconnection from the vehicle 200. For example, the out-of-vehicle function list 153 may contain, as the default, a navigation function, a parking tracking function, and the like. Such registered functions can be deleted or replaced with another, depending on user's setting. Also, the out-of-vehicle function list 153 can further contain a Wireless Fidelity (WiFi) auto access function, a game function, or the like, depending on user's setting.

The control unit 160 may support the whole flow of signals and the management of data processing, delivery and storage in connection with a control for the operation of the mobile device 100. Particularly, the control unit 160 may perform the activation and inactivation of a function for vehicle-connected operation. For performing the activation and inactivation of a function for vehicle-connected operation, the control unit 160 can have the configuration shown in FIG. 3.

Figure 3:
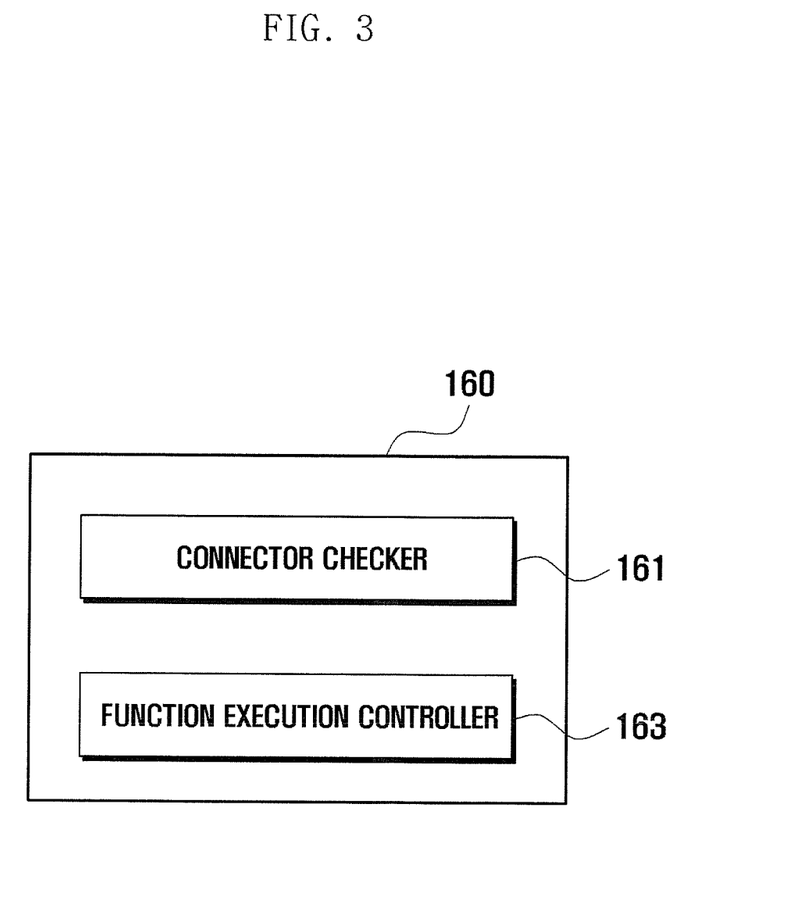
FIG. 3 is a block diagram illustrating elements of the control unit shown in FIG. 2.

FIG. 3 is a block diagram illustrating elements of the control unit 160 shown in FIG. 2.

Referring to FIG. 3, the control unit 160 may include a connector checker 161 and a function execution controller 163.

The connector checker 161 is configured to check whether the vehicle connector 210 is connected with the connector 170. Particularly, the connector checker 161 may distinguish the connection of the vehicle connector 210 in an activated state of the in-vehicle electronic control system 220 from the connection of the vehicle connector 210 in an inactivated state. If the connection of the vehicle connector 210 is made in an activated state of the in-vehicle electronic control system 220 and thereby if any vehicle data provided by the in-vehicle electronic control system 220 is received, the connector checker 161 may transfer information associated with the connection of the vehicle 200 to the function execution controller 163. If the in-vehicle electronic control system 220 is inactivated while the vehicle connector 210 is connected (for example, if the vehicle 200 is stalled), the connector checker 161 may transfer this information to the function execution controller 163. Namely, the connector checker 161 may transmit, to the function execution controller 163, information about the connection of the vehicle connector 210 in an inactivated state of the in-vehicle electronic control system 220. Also, when the vehicle connector 210 is separated from the connector 170, the connector checker 161 may transfer this disconnection information to the function execution controller 163.

The function execution controller 163 may select one of both the in-vehicle function list 151 and the out-of-vehicle function list 153 on the basis of vehicle connection information received from the connector checker 161, and then invokes a predefined user function. Specifically, when the vehicle connector 210 coupled to the activated in-vehicle electronic control system 220 is connected with the connector 170 of the mobile device 100, the function execution controller 163 may automatically invoke a particular user function from the in-vehicle function list 151. For example, the function execution controller 163 may automatically invoke a navigation function and output an associated screen to the display unit 140. If a music play function is also contained in invocation selection information, the function execution controller 163 may play at least one predefined music file and outputs it through the audio processing unit 130. Additionally, if a black box function is further contained in invocation selection information, the function execution controller 163 may activate the camera of the mobile device 100 and performs a black box function by capturing and storing images.

If the vehicle connector 210 is disconnected from the connector 170 of the mobile device 100, the function execution controller 163 may check the out-of-vehicle function list 153 stored in the memory unit 150 and automatically invoke a particular user function. In this case, the function execution controller 163 may output, through the display unit 140, a specific item for selecting one of an out-of-vehicle operation mode and the inactivation of a vehicle-connected operation mode when the vehicle connector 210 is disconnected. If a user selects the out-of-vehicle operation mode, the function execution controller 163 may automatically invoke a user function registered in the out-of-vehicle function list 153. If a user selects the inactivation of the vehicle-connected operation mode, the function execution controller 163 may change to a normal function mode of the mobile device 100. For example, the function execution controller 163 may control the mobile device 100 to be in an idle screen output state, in a menu screen output state, or in a sleep state.

If the vehicle connector 210 is connected with the connector 170 in an inactivated state of the in-vehicle electronic control system 220, the function execution controller 163 may perform a predefined standby operation mode. For this standby operation mode, a standby function list may be stored in the memory unit 150, and a user can register desired user functions in the standby function list through a setting screen.

For example, if the vehicle connector 210 is connected with the connector 170, the function execution controller 163 may automatically invoke a music play function registered in the standby function list and support the output of audio data. In this case, if any user function which is not registered in the standby function list is in an activated state, the function execution controller 163 may change an activated state of the user function to an inactivated state. For example, when a user connects, first of all, the connector 170 of the mobile device 100 with the vehicle connector 210, the function execution controller 163 may perform a specific user function (for example, a music play function), on the basis of a predefined standby function list. Additionally or alternatively, the function execution controller 163 may perform a broadcast reception function, a black box function, or the like depending on the function registered in advance in the standby function list.

When the in-vehicle electronic control system 220 is activated, the function execution controller 163 may support the execution of user function based on the in-vehicle function list 151. If a music play function in the standby function list is also registered in the in-vehicle function list 151, the function execution controller 163 may continue to execute the music play function. Thereafter, if the in-vehicle electronic control system 220 is inactivated while the vehicle connector 210 is connected with the connector 170, the function execution controller 163 may enter again into a standby operation mode. In this case, if the standby function list contains both a music play function and a black box function, the function execution controller 163 may execute both functions and inactivates other functions (for example, a navigation function) registered in the in-vehicle function list 151 but not contained in the standby function list. Thereafter, when the vehicle connector 210 is disconnected from the connector 170, the function execution controller 163 may activate a function registered in the out-of-vehicle function list 153. In this case, if the out-of-vehicle function list 153 contains a music play function but not a black box function, the function execution controller 163 may inactivate the black box function and continues to execute the music play function. Then, if an input event for terminating a vehicle-connected operation occurs, the function execution controller 163 may allow the mobile device 100 to be in a sleep state or any other predefined state.

As discussed above, the mobile device 100 may automatically invoke predefined functions among various user functions provided by the mobile device 100, depending on a state of being connected with the vehicle 200, thus minimizing user's manipulations and allowing an instant use of a necessary function.

Figure 4:
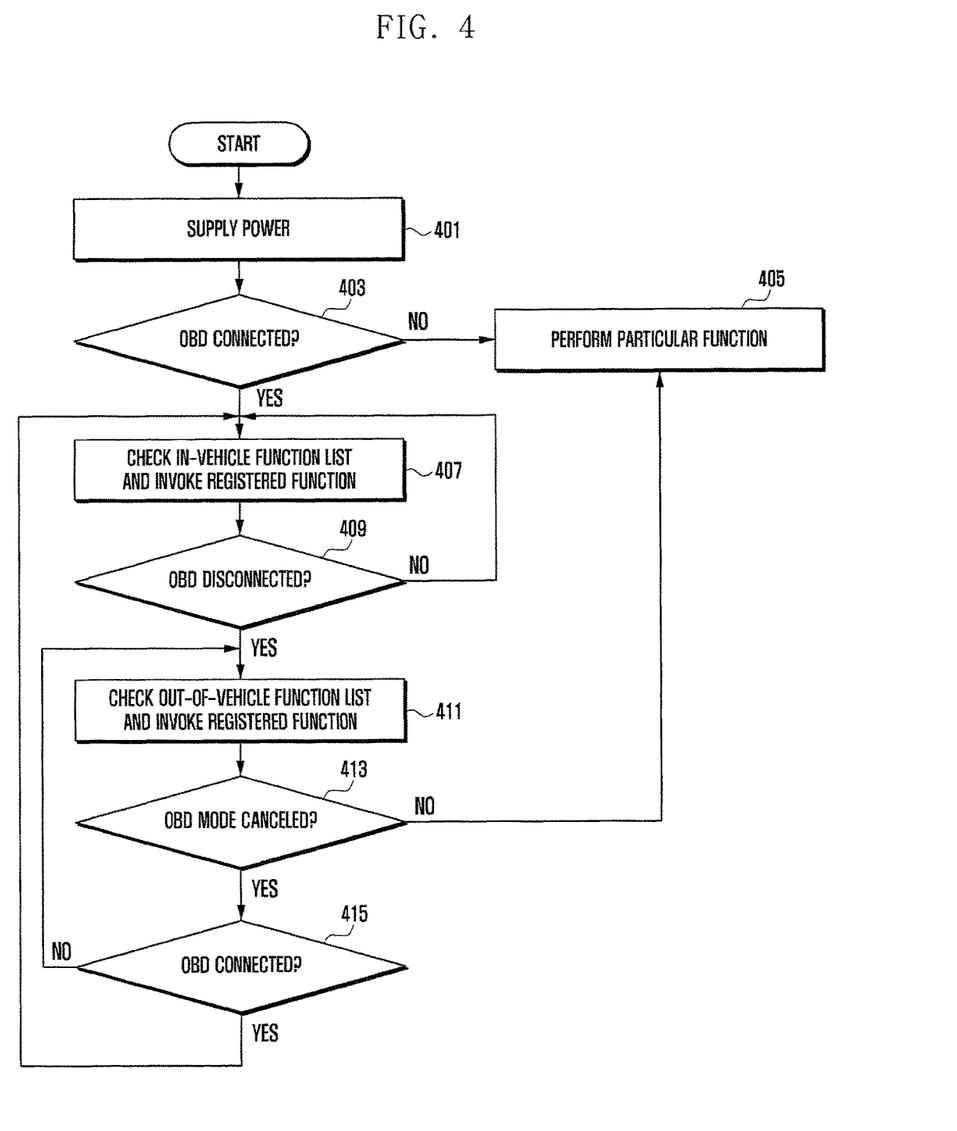
FIG. 4 is a flow diagram illustrating a method for vehicle-connected operation of a mobile device in accordance with embodiments of this disclosure.

FIG. 4 is a flow diagram illustrating a method for vehicle-connected operation of a mobile device in accordance with embodiments of this disclosure.

Referring to FIG. 4, at operation 401, the control unit 160 may supply electric power to elements of the mobile device 100. In operation 403, if an input event occurs from at least one of the connector 170, the input unit 120 and the display unit 140 having an input function, the control unit 160 may check whether the input event corresponds to the connection of the OBD, which is the in-vehicle electronic control system 220. Namely, the control unit 160 checks whether an input event corresponding to the connection of the in-vehicle electronic control system 220 occurs through the connector 170. The in-vehicle electronic control system 220 can then transmit vehicle data to the mobile device 100 through both the vehicle connector 210 and the connector 170. Meanwhile, if an input event occurring at operation 403 is not for the OBD connection, the control unit 160 may perform a particular function according to the input event at operation 405. For example, the control unit 160 may perform a file execution function, a file edit function, a file transmission function, or the like.

If an input event corresponding to the OBD connection occurs at operation 403, the control unit 160 may check the in-vehicle function list 151 and perform a predefined function at operation 407. At this time, if two or more user functions are registered as invocation selection information in the in-vehicle function list 151, the control unit 160 may activate each function. Particularly, if the in-vehicle function list 151 contains two or more user functions that require the display unit 140, the control unit 160 may divide a screen of the display unit 140 into two or more sections 142 and 144 each of which is allocated to each function. For example, if the in-vehicle function list 151 contains a broadcast reception function and a navigation function, the control unit 160 may divide a screen of the display unit 140 to separately output a navigation screen and a broadcast receiving screen. In addition, the audio processing unit 130 may simultaneously output audio data contained in broadcast data and guidance data associated with a navigation function.

In operation 409, the control unit 160 may check whether the disconnection of OBD occurs, namely, whether the connector 170 is separated from the vehicle connector 210 coupled to the activated in-vehicle electronic control system 220. If the connection is still maintained, the control unit 160 may return to and perform again operation 407.

Meanwhile, when the vehicle connector 210 is disconnected from the connector 170 at operation 409, the control unit 160 may check the out-of-vehicle function list 153 and perform a predefined function at operation 411. For example, if a parking tracking function is set in the out-of-vehicle function list 153, the control unit 160 may activate the GPS 180 and collect information about the current vehicle location when the vehicle connector 210 is separated from the connector 170. After the collection of vehicle location, the control unit 160 may control the GPS 180 to be inactivated. Then, if an input signal for checking a parking location is received, the control unit 160 may again activate the GPS 180, collect the current location information, and perform a parking tracking function on the basis of both the collected current location information and previously collected vehicle location information. If map information is provided, the control unit 160 may output both locations on the map information.

Next, at operation 413, the control unit 160 may check whether an input event for the cancel of OBD mode occurs. Namely, the control unit 160 may check (for example, determines) whether an input signal for terminating a vehicle-connected operation mode is received. Accordingly, the control unit 160 may support the output of a menu or icon for terminating a vehicle-connected operation mode. Then, when such a menu or icon is selected, the control unit 160 may recognize this selection signal as an input signal for terminating a vehicle-connected operation mode. In this case, the control unit 160 may terminate a vehicle-connected operation mode and returns to operation 405 to perform a particular user function in response to user's manipulation.

If there is no cancel of OBD mode at operation 413, the control unit 160 may check at operation 415 whether the OBD connection is maintained. In case of disconnection, the control unit 160 may return to operation 411 to maintain a function based on the out-of-vehicle function list 153. In case of connection, the control unit 160 may return to and again performs operation 407.

Although the above discussion is focused on a process in which the vehicle connector 210 is connected with the connector 170 in an activated state of the in-vehicle electronic control system 220, this is an example only, and not to be considered as a limitation of embodiments. Alternatively, as discussed above for the function execution controller 163, the control unit 160 may also perform specific functions based on a standby function list when the vehicle connector 210 coupled to the inactivated in-vehicle electronic control system 220 is connected. Such alternative case can be optionally used depending on designer's intention.

Figure 5:
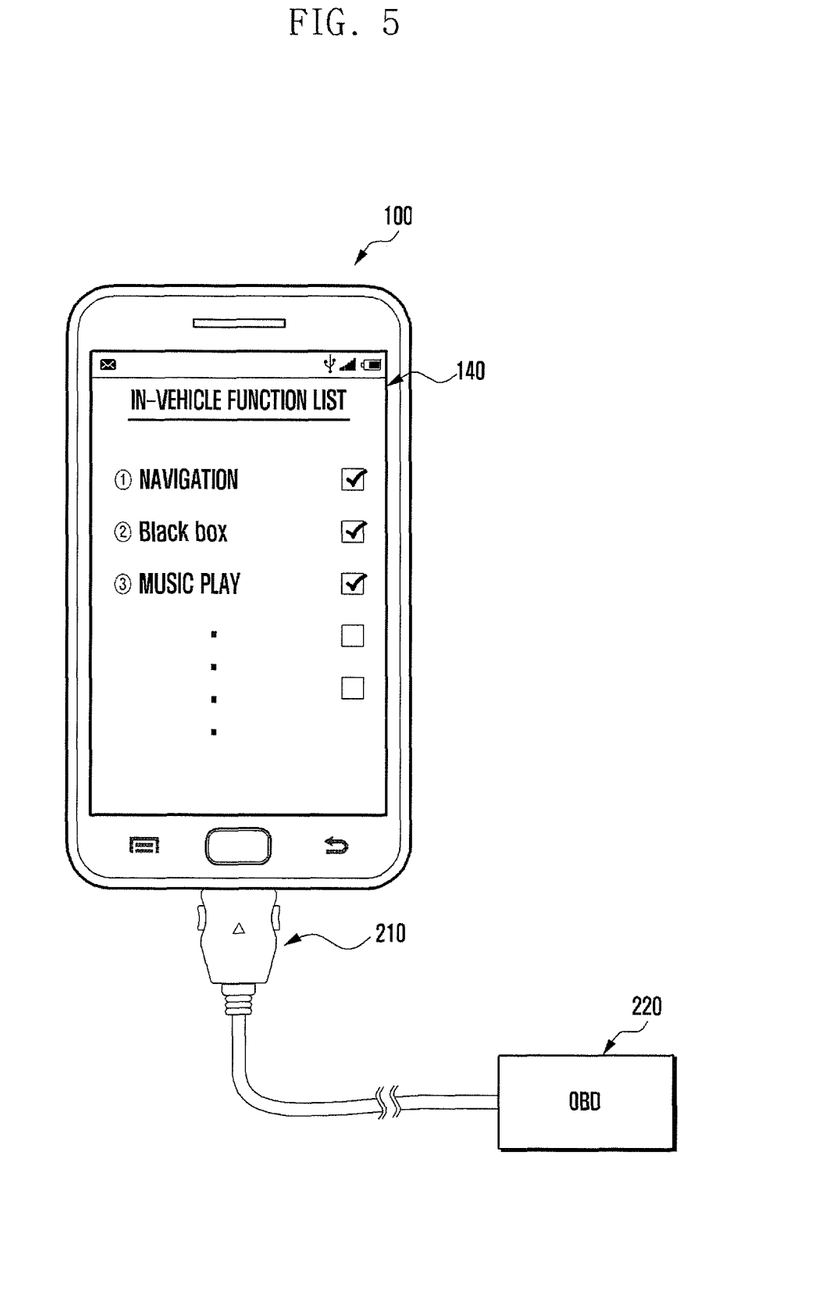
FIG. 5 illustrates an example of a screen interface in a mobile device connected with a vehicle in accordance with embodiments of the present disclosure.

FIG. 5 illustrates an example of a screen interface in a mobile device connected with a vehicle in accordance with embodiments of the present disclosure.

Referring to FIG. 5, when the vehicle connector 210 coupled to the activated in-vehicle electronic control system 220 is connected with the connector 170, or when the vehicle connector 210 is connected with the connector 170 and then the in-vehicle electronic control system 220 is activated, the control unit 160 may control the display unit 140 to output the in-vehicle function list 151 as shown.

The in-vehicle function list 151 may indicate that a navigation function, a music play function, and a black box function are registered as invocation selection information. By toggling each item in invocation selection information, a user can modify specific user functions defined to be automatically invoked through the in-vehicle function list 151.

When a given time elapses after the in-vehicle function list 151 is outputted, the control unit 160 may automatically invoke specific user functions registered as invocation selection information. Specifically, the control unit 160 may invoke a navigation function stored in the memory unit 150 and activate the GPS 180 to collect location information. If the navigation function is provided on the basis of access to a server, the control unit 160 may activate the communication unit 110 and perform access to the server to receive navigation-related information. Also, for supporting a black box function, the control unit 160 may activate the camera and perform the black box function by capturing and storing images.

In the above case, specific functions contained in the in-vehicle function list 151 may be performed after the elapse of a given time from the output of the in-vehicle function list 151. Alternatively, the control unit 160 may automatically invoke user functions contained in the in-vehicle function list 151 without outputting the in-vehicle function list 151. In this case, the mobile device 100 may provide a separate item for setting the in-vehicle function list 151.

Figure 6:
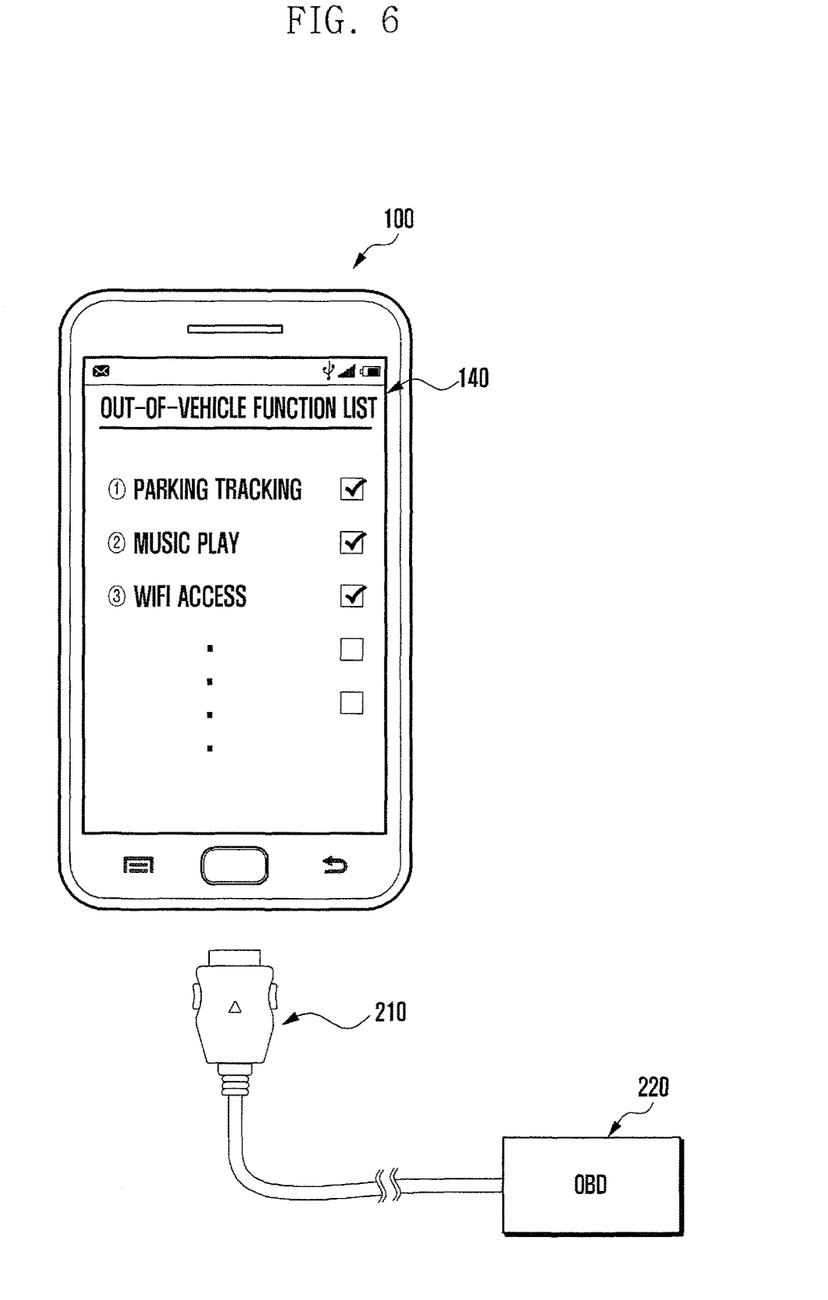
FIG. 6 illustrates an example of a screen interface in a mobile device disconnected from a vehicle in accordance with embodiments of the present disclosure.

FIG. 6 illustrates an example of a screen interface in a mobile device disconnected from a vehicle in accordance with embodiments of the present disclosure.

Referring to FIG. 6, when the vehicle connector 210 is disconnected from the connector 170, or when the in-vehicle electronic control system 220 is inactivated, even though the vehicle connector 210 is connected in a non-support state of standby operation mode, the control unit 160 may control the display unit 140 to output the out-of-vehicle function list 153 as shown.

The out-of-vehicle function list 153 may indicate that a parking tracking function, a music play function, and a WiFi access function are registered as invocation selection information. Such functions can be replaced with another, depending on user's setting. Also, a new function can be added to the out-of-vehicle function list 153, and a registered function can be deregistered. The control unit 160 may allow the out-of-vehicle function list 153 to be displayed for a given time, and after the elapse of a given time, automatically performs registered function. Namely, when the vehicle connector 210 is disconnected, the control unit 160 may activate the GPS 180 to support a parking tracking function, perform a music play function, and perform a radio access point scan for WiFi auto access. Also, the control unit 160 may immediately invokes specific functions without outputting the out-of-vehicle function list 153 in response to the disconnection of the vehicle connector 210.

Meanwhile, the control unit 160 may output a specific item for selecting one of an out-of-vehicle operation mode and the inactivation of a vehicle-connected operation mode before outputting the out-of-vehicle function list 153. If the out-of-vehicle operation mode is selected, the control unit 160 may output the out-of-vehicle function list 153 and automatically invokes predefined functions. If the inactivation of the vehicle-connected operation mode is selected, the control unit 160 may output an idle screen or a menu screen, which is defined as the default by the mobile device 100, to the display unit 140, or enter into a sleep state without invoking predefined user function.

Additionally, the display unit 140 of the mobile device 100 may provide a setting screen for setting a standby function list, which can be used when the vehicle connector 210 is connected with the connector 170 in an inactivated state of the in-vehicle electronic control system 220 as shown in FIG. 5.

As discussed hereinbefore, the vehicle-connected operation method may use one of the in-vehicle function list 151 and the out-of-vehicle function list 153, depending on the connection or disconnection of the vehicle connector 210. Further, depending on whether the in-vehicle electronic control system 220 is activated as well as whether the vehicle connector 210 is connected, one of the in-vehicle function list 151, the out-of-vehicle function list 153 and the standby function list can be selectively used. Namely, by merely starting the vehicle 200 and connecting the mobile device 100 with the vehicle connector 210, a user can easily use specific user function automatically invoked.

According to a digital convergence tendency today, the above-described mobile device can essentially or selectively further include any other elements such as a short-range communication module, a wired or wireless communication interface, an Internet communication module, a digital broadcast receiving module, and the like. As will be understood by those skilled in the art, some of the above-mentioned elements in the mobile device may be omitted or replaced with another.

Additionally, the mobile device according to embodiments disclosed herein can be applied to various types of mobile communication terminals such as a cellular phone, a smart phone, a tablet PC, a handheld PC, a PMP (portable multimedia player), a PDA (personal digital assistant), a notebook, a portable game console, and the like.

Although the present disclosure has been described with an example, various changes and modifications may be suggested to one skilled in the art. It is intended that the present disclosure encompass such changes and modifications as fall within the scope of the appended claims.

What is claimed is:
1. A system for vehicle-connected operation of a mobile device, the system comprising:
a vehicle including an in-vehicle electronic control system configured to activate in response to an ignition start signal;
a vehicle connector coupled to the in-vehicle electronic control system; and
a mobile device configured to:
automatically invoke at least one predefined user function from a standby function list in response to a connection of a connector of the mobile device with the vehicle connector and an inactivated state of the in-vehicle electronic control system,
automatically invoke at least one predefined user function from an in-vehicle function list in response to a connection of the connector of the mobile device with the vehicle connector and an activated state of the in-vehicle electronic control system, and
automatically invoke at least one predefined user function from an out-of-vehicle function list in response to a disconnection of the connector of the mobile device with the vehicle connector,
wherein the standby function list, the in-vehicle function list and the out-of-vehicle function list include different sets of functions, and
wherein the at least one predefined user function registered in the standby function list includes a specific function that is also included in the at least one predefined user function registered in the in-vehicle function list.

2. A mobile device for supporting vehicle-connected operation, the mobile device comprising:
a connector configured to couple to a vehicle connector; and
a hardware control unit configured to:
check a standby function list having at least one predefined user function registered in the standby function list in response to a connection of the vehicle connector with the connector and an inactivated state of an in-vehicle electronic control system, and automatically invoke the at least one predefined user function registered in the standby function list,
check an in-vehicle function list having at least one predefined user function registered in the in-vehicle function list in response to a connection of the vehicle connector with the connector and an activated state of the in-vehicle electronic control system, and
automatically invoke the at least one predefined user function registered in the in-vehicle function list,
wherein the standby function list and the in-vehicle function list include different sets of functions; and
wherein the at least one predefined user function registered in the standby function list includes a specific function that is also included in the at least one predefined user function registered in the in-vehicle function list.

3. The device of claim 2, wherein the control unit is further configured to check an out-of-vehicle function list having at least one predefined user function registered in the out-of-vehicle function list in response to a disconnection of the vehicle connector from the connector, and to automatically invoke the at least one predefined user function registered in the out-of-vehicle function list.

4. A mobile device for supporting vehicle-connected operation, the device comprising:
a connector configured to connect with a vehicle connector; and
a hardware control unit configured to:
check an out-of-vehicle function list having at least one predefined user function registered therein in response to a disconnection of the vehicle connector from the connector, and to automatically invoke the at least one predefined user function registered in the out-of-vehicle function list, and
check a standby function list having at least one predefined user function registered therein in response to an in-vehicle electronic control system coupled to the vehicle connector entering an inactivated state, and to automatically invoke the at least one predefined user function registered in the standby function list,
wherein the standby function list and the out-of-vehicle function list include different sets of functions; and
wherein the at least one predefined user function registered in the standby function list includes a specific function that is also included in the at least one predefined user function registered in the out-of-vehicle function list.

5. The device of claim 4, wherein the control unit is further configured to check an in-vehicle function list having at least one predefined user function registered therein in response to a reconnection of the vehicle connector with the connector, and to automatically invoke the at least one predefined user function registered in the in-vehicle function list.

6. A method for vehicle-connected operation of a mobile device, the method comprising:
recognizing, by the mobile device, connection of a vehicle connector with a connector of the mobile device;
checking, by the mobile device, a standby function list having at least one predefined user function registered in the standby function list, when an in-vehicle electronic control system coupled to the vehicle connector is in an inactivated state;
automatically invoking, by the mobile device, the at least one predefined user function registered in the standby function list;
checking, by the mobile device, an in-vehicle function list having at least one predefined user function registered in the in-vehicle function list when an in-vehicle electronic control system coupled to the vehicle connector is in an activated state; and
automatically invoking, by the mobile device, the at least one predefined user function registered in the in-vehicle function list,
wherein the standby function list and the in-vehicle function list include different sets of functions; and
wherein the at least one predefined user function registered in the standby function list includes a specific function that is also included in the at least one predefined user function registered in the in-vehicle function list.

7. The method of claim 6, wherein the automatically invoking of the user function based on the in-vehicle function list includes at least one of:
invoking a navigation function and outputting a screen associated with the navigation function to a display unit of the mobile device;
invoking a black box function by activating a camera of the mobile device and capturing and storing images by using the camera;
invoking a music play function and playing a predefined music file; and
invoking a broadcast reception function and receiving broadcast data.

8. The method of claim 6, further comprising:
when the in-vehicle function list contains two or more user functions that require a display unit of the mobile device, dividing a screen of the display unit into two or more sections, each section allocated to a corresponding user function.

9. The method of claim 6, further comprising:
recognizing disconnection of the vehicle connector from the connector;
checking an out-of-vehicle function list having at least one predefined user function registered therein; and
automatically invoking the at least one predefined user function registered in the out-of-vehicle function list.

10. The method of claim 9, wherein the automatic invocation of the user function based on the out-of-vehicle function list includes at least one of:

invoking a parking tracking function by activating a location tracking module, collecting location information through the location tracking module, and offering the location information of a parked vehicle; and invoking a music play function and playing a predefined music file.

11. The method of claim 9, wherein the automatic invocation of the user function based on the out-of-vehicle function list includes:

invoking a WiFi access function and performing a radio access point scan.

12. The method of claim 9, wherein the automatic invocation of the user function based on the standby function list includes:

invoking a music play function and playing a predefined music file.

13. The method of claim 9, wherein the automatic invocation of the user function based on the standby function list includes:

invoking a black box function by activating a camera of the mobile device and capturing and storing images by using the camera.

14. The method of claim 9, wherein the automatic invocation of the user function based on the standby function list includes:

invoking a broadcast reception function and receiving broadcast data.

15. A method for vehicle-connected operation of a mobile device, the method comprising:

recognizing, by the mobile device, disconnection of a vehicle connector from a connector of the mobile device;

recognizing, by the mobile device, connection of the vehicle connector from the connector of the mobile device, checking, by the mobile device, an out-of-vehicle function list including at least one predefined user function registered and automatically invoking, by the mobile device, the at least one predefined user function registered in the out-of-vehicle function list;

recognizing, by the mobile device, connection of the vehicle connector from the connector of the mobile device and an inactive state of an in-vehicle electronic control system;

based upon recognition of the connection of the vehicle connector to the connector of the mobile device and the inactive state of the in-vehicle electronic control system, checking, by the mobile device, a standby function list including at least one predefined user function registered; and automatically invoking, by the mobile device, the at least one predefined user function registered in the standby function list; and wherein the standby function list and an in-vehicle function list includes different sets of functions, and wherein the at least one predefined user function registered in the standby function list includes a specific function that is also included in the at least one predefined user function registered in the out-of-vehicle function list.

16. The method of claim 15, further comprising:

when the vehicle connector is reconnected with the connector, checking an in-vehicle function list having at least one predefined user function registered therein, and automatically invoking the at least one predefined user function registered in the in-vehicle function list.

17. The device of claim 2, wherein the hardware control unit is further configured to: continue to execute the specific function in response to a connection of the vehicle connector with the connector and a state change of the in-vehicle electronic control system from the inactivated state to the activated state.

18. The device of claim 3, wherein the at least one predefined user function registered in the standby function list includes a specific function that is also included in the at least one predefined user function registered in the out-of-vehicle function list; and wherein the hardware control unit is further configured to: continue to execute the specific function in response to a change from a connection to a disconnection of the vehicle connector from the connector and the activated state of the in-vehicle electronic control system.

19. The device of claim 3, wherein the hardware control unit is further configured to at least one of:

in response to a connection of the vehicle connector with the connector and a state change of the in-vehicle electronic control system from the activated state to the inactivated state, inactivate functions registered in the in-vehicle function list but not also registered in the standby function list, and in response to a change from a connection to a disconnection of the vehicle connector from the connector and the inactivated state of the in-vehicle electronic control system, inactivate functions registered in the standby function list but not also registered in the out-of-vehicle function list.

* * * * *